Jan. 31, 1961
K. A. HARPER
2,970,117
CATALYST REGENERATION AND APPARATUS THEREFOR
Filed May 10, 1957
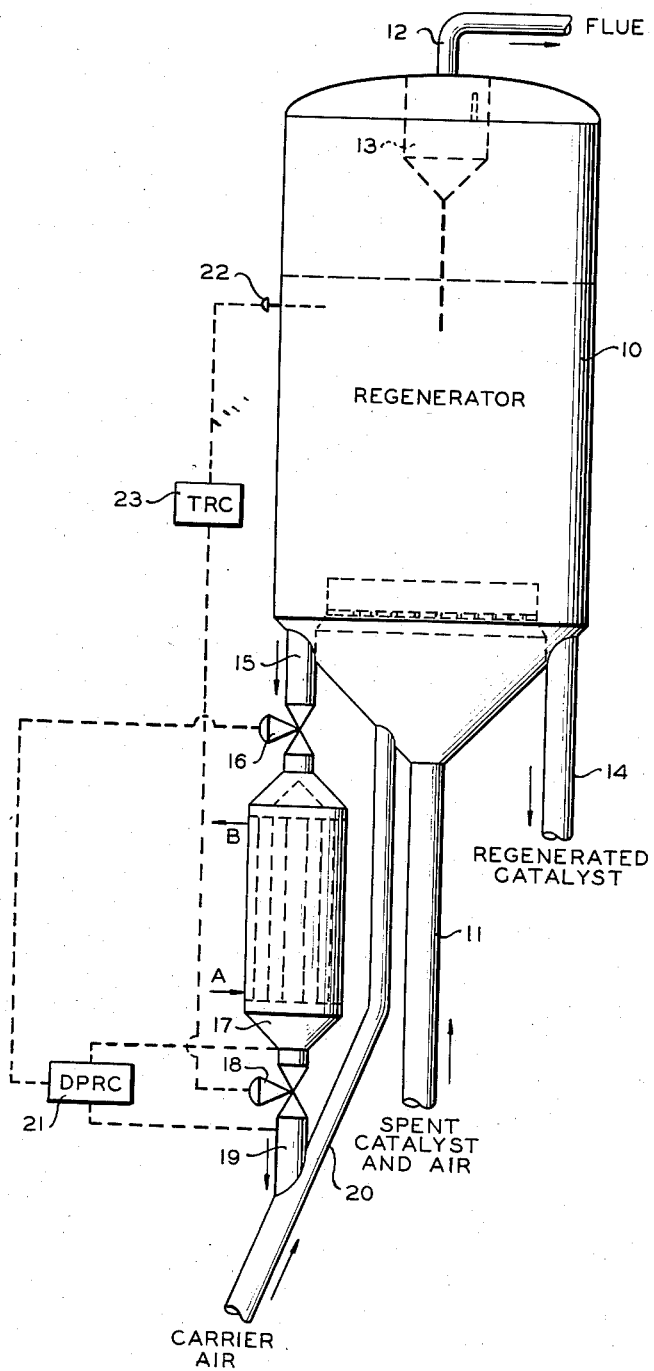
INVENTOR.
K. A. HARPER
BY
*Hudson & Young*
ATTORNEYS United States Patent Office 2,970,117
Patented Jan. 31, 1961

2,970,117
CATALYST REGENERATION AND APPARATUS THEREFOR

Kenneth A. Harper, Bartlesville, Okla., assignor to Phillips Petroleum Company, a corporation of Delaware Filed May 10, 1957, Ser. No. 658,303

4 Claims. (Cl. 252—417)

This invention relates to regeneration of a catalyst. In one of its aspects this invention relates to a method and apparatus for regenerating a conversion catalyst by contacting the same with regeneration fluid resulting in an increase of the temperature of the same, requiring control of the said temperature, the regeneration of the catalyst being accomplished to avoid erosion of a discharge valve located at the outlet of a catalyst cooler, which valve is operated responsive to the temperature of catalyst undergoing regeneration, by positioning a second valve at the inlet to said cooler and controlling the flow through said valve at the inlet of said cooler responsive to the pressure drop across said outlet valve to maintain said pressure drop below a predetermined maximum. In a further aspect of the invention there are provided a method and apparatus, substantially as described, especially suited to the regeneration of fluidized solids conversion catalyst, for example, those of fluidized solids catalyst which are employed in hydrocarbon conversion operations such as, cracking, reforming, isomerization, alkylation, polymerization to form liquid and solid compounds, etc.

In my application Serial No. 432,278, filed May 25, 1954, now U.S. Patent 2,905,635, there is set forth a method for controlling the erosion of a first variable flow control regulator means in a conduit conveying an erosive fluid downwardly which comprises providing in said conduit a second variable flow control regulator means above said first variable flow control regulator means and controlling the quantity of fluid flowing through said second variable flow control regulator means and exerting a static head upon said first variable flow regulating means responsive to the pressure drop across said first variable flow control regulator means to maintain said pressure drop below a predetermined maximum. There is also disclosed an apparatus for conveying downwardly a fluid comprising, in combination, a substantially upright conduit; a variable flow control valve in said conduit; a flow control regulating valve disposed in a portion of said conduit upstream of, and removed from said first mentioned valve and means to control said flow control regulating valve responsive to the pressure drop across said variable flow control valve.

More specifically, in said application there is described and claimed a method for converting a hydrocarbon in the presence of a fluidized catalyst which comprises in combination the steps as follows: (1) admixing said hydrocarbon with said catalyst and (2) conveying said admixture through a transfer pipe into a reactor vessel, maintained under hydrocarbon conversion conditions, and (3) maintaining a bed of dense phase hydrocarbon and catalyst mixture in said reactor for a time sufficient to convert said hydrocarbon, (4) removing spent catalyst from said bed into a transfer pipe, located in a substantially upright position below said reactor, (5) from said last mentioned pipe by way of a withdrawal valve removing said catalyst into another transfer pipe for admixture with transport gases and (6) transporting the said admixture to a regenerator vessel, (7) in said vessel regenerating said catalyst under regenerating conditions, (8) withdrawing regenerated catalyst from said regenerator through a transfer pipe located in a substantially upright position below said regenerator, (9) passing said regenerated catalyst through a withdrawal valve from said last mentioned pipe into said first mentioned transfer pipe, (10) admixing said hydrocarbon for transfer to said reactor as described, (11) maintaining in each of said substantially upright positioned transfer pipes above said withdrawal valves therein a level of dense phase fluidized catalyst and controlling the level of the dense phase of fluidized catalyst in said pipes by means of a second valve in each of said pipes positioned above each of said withdrawal valves by operating said second valves responsive to the pressure differential across each of said withdrawal valves, respectively, to maintain said pressure differential below a predetermined maximum.

Still further in said application there is disclosed and claimed an apparatus suitable for the conversion of hydrocarbons comprising, in combination, a fluidized catalyst supply source; a reactor adapted to contain a bed of fluidized catalyst and hydrocarbon undergoing conversion; a standpipe in communication with said fluidized catalyst supply source and with a pipe which communicates with said reactor and which is adapted to convey hydrocarbon vapor and fluidized catalyst to said reactor; a withdrawal valve in a lower portion of said standpipe adapted to regulate flow of dense phase fluidized catalyst therefrom into said pipe communicating with said reactor; a temperature recorder controller operatively connected with an inner point of said reactor and with said valve; a second valve above said first-mentioned valve in said standpipe disposed above said first valve and adapted to regulate the level of dense phase within said standpipe above said first-mentioned valve but below said second valve; a differential pressure recorder controller operatively connected to said second valve to control said second valve responsive to the differential pressure across said first-mentioned valve; a second standpipe in communication with a lower portion of said reactor and with a pipe through which catalyst from said second standpipe can be conveyed to a catalyst supply source; a first valve in a lower portion of said second standpipe adapted to regulate flow of dense phase catalyst from said pipe; a second valve in said second standpipe above said first-mentioned valve adapted to control a level of dense phase catalyst in said second standpipe above said first valve but below said second valve; a differential pressure recorder controller adapted to control said second valve in said second standpipe and operatively connected with said second valve in said second standpipe to control the same responsive to the pressure differential across said first valve in said second standpipe; a differential pressure recorder controller operatively connected to said reactor and to said first valve in said second standpipe to control said first valve in said second standpipe responsive to the level of dense phase fluidized catalyst in said reactor.

Still further, in the said application there is disclosed a formula which is of assistance in readily determining the various size and flow relationships which are involved in the present invention.

In summary, the disclosure of said application which is incorporated herein by reference, to the extent it is already not recited herein, discusses that the erosion of a slide or other valve in a standpipe conducting fluidized solids from a regenerator, a reactor or other vessel, can be substantially minimized or eliminated at variable rates of flow through said valve by maintaining at a substantial height above said first-mentioned valve a second valve which is operated to control a dense phase catalyst above said first valve but below said second valve to a level such that the pressure differential across said first mentioned valve is maintained substantially constant, the said second valve being operated responsive to the pressure differential across said first mentioned valve. It will be noted, as described in said application, that while the pressure differential is maintained substantially constant below a predetermined maximum value, the flow through said first-mentioned valve can be varied or can occur at variable rates. The second valve is not subject to as high a pressure differential as is the first valve because it is placed at a substantially higher level than said first-mentioned valve. Further, because the dense phase maintained above said first-mentioned valve but below said second mentioned valve is in a sense independent from the dense phase maintained above said second mentioned valve which acts to allow to pass through itself only so much of the dense phase above it as is required to maintain the required level of dense phase below it, variations of density in the dense phase above said second valve, and therefore, even in a vessel leading to said second valve, can no longer influence said first-mentioned valve. Yet the flow through said second-mentioned valve will be such that the desired weight of the catalyst particles will be passed therethrough.

The foregoing considerations are applicable to the specific embodiment of the present invention which will now be described as it relates to the regeneration of a hydrocarbon conversion catalyst of the fluidizable type consisting essentially of silica-alumina and having been used to convert a 33° API gas oil to produce therefrom gasoline and other valuable products at an elevated temperature, in this instance, 925° F. The catalyst as obtained from the reactor after stripping, as is conventionally practiced in the art, contains a layer of coke which is burned off in a regenerator vessel employing air which supplies oxygen for the combustion which is required. During this combustion the temperature of the catalyst tends to exceed a desirable maximum. The temperature of the catalyst is controlled as will be described, employing a catalyst cooler constructed and operated according to the present invention.

It has occurred to me and is a basic concept of the present invention that a problem of erosion which has been experienced in a cooler outlet valve, as described herein, can be substantially eliminated or at least considerably reduced by applying to said valve considerations similar to those set out above as being contained in said application Serial No. 432,278, filed May 25, 1954, by me.

It is an object of the present invention to provide a method and an apparatus for the regeneration of catalyst, particularly of the erosive type such as fluidized catalyst. It is another object of the present invention to provide a method and apparatus for regeneration of fluidized type solid particle catalyst wherein a side cooling zone or heat exchanger is employed through which a down flow of fluidized catalyst particles is maintained and wherein there is also maintained a head of dense phase fluidized catalyst. A further object of the invention is the provision of certain valves and control responsive to the temperature of catalyst being regenerated as more fully set forth and described herein.

Other aspects, objects and several advantages of this invention are apparent from a study of the disclosure, drawing, and appended claims.

According to the present invention, there are provided a method and apparatus which comprise a side cooling zone, valves above and below said side cooling zone, said cooling zone being adapted to cool a solid, subdivided catalyst, especially of the fluidized type, the valve below the cooling zone being one of the variable flow rate type and being adjusted responsive to cooling requirements, for example, as indicated by the temperature of a bed of catalyst being regenerated, and the valve above the cooling zone being also of the variable flow rate type and flow therethrough being regulated responsive to the pressure drop across the valve below the cooling zone to maintain said pressure drop below a predetermined maximum, the correlation of operation of the valves being adjusted or such that a suitable depth of fluidized or other catalyst is maintained in said cooling zone for removal of heat therefrom.

The drawing shows a catalyst and regenerator 10 equipped with side cooler 17, this side cooler is adapted to act as a boiler of heat exchanger type to which water is fed at A and from which water is removed at B together with steam which has been formed. It will be understood by those skilled in the art in possession of this disclosure that the quantity of water passed in at A will control the quantity of water and/or steam removed at B. It is possible to completely vaporize all of the water introduced at A.

Spent catalyst from a cracking vessel, not shown for sake of simplicity, and air are passed via riser 11 into regenerator vessel 10. In vessel 10 the fluidized catalyst is maintained substantially as a dense phase bed from which regeneration gases including combustion gases or flue gases are removed to the space above the bed of catalyst and from said space by way of cyclone 13 and pipe 12 from the vessel. Regenerated catalyst as required is taken from the bed of catalyst in vessel 10 by way of down-leg pipe 14 and returned to the cracking reactor, after passing via stripping zone, not shown.

In order to control the temperature in the regenerator within the conventional limits, in this case not to exceed 1250° F., a portion of the heated catalyst from regenerator 10 is passed downwardly in dense phase via line 15 containing valve 16 to heat exchanger or boiler 17. In heat exchanger 17 the temperature of the solids is reduced and these are passed by valve 18 and pipe 19 into pipe 20 where with carrier air the cooled solids are fluidized further and returned to vessel 10.

Valve 18 is controlled responsive to the temperature in the regenerator by temperature sensing means 22, a thermocouple in this specific embodiment, and temperature recorder controller 23. The construction of the thermocouple, the temperature recorder controller, and the associated equipment is standard or conventional in the art and is not here described for this reason. One skilled in the art in possession of this disclosure will be able to select readily such equipment. As the temperature in the regenerator increases above a predetermined maximum, valve 18 which is open substantially all of the time is further opened to effect a greater flow of solids from cooler 17. Valve 16 is controlled responsive to the differential pressure across valve 18 using delta or differential pressure recorder controller 21. Such pressure recorder controllers are standard equipment in the art. Therefore, one skilled in the art in possession of this disclosure will be able to select such equipment. Therefore, no detailed description of such equipment is here required. As the flow of catalyst through valve 18 is increased, the pressure drop thereacross decreases causing valve 16 to further open to allow more solids to flow through the cooler.

Although the catalyst is shown returned by way of pipe 20 in this specific embodiment of the invention it is possible to connect pipe 19 directly to pipe 11 and to return catalyst in such manner.

It will be noted that according to this invention there are obtained advantages of a down flow cooler with elimination of erosion to the tubes of the boiler, dense phase flow of catalyst in the cooler results in more efficient heat transfer over dilute phase flow of an up flow system, giving more rapid effect of temperature control over the regenerator, yet the problem of erosion of the outlet valve 18 has been eliminated or considerably minimized. Further, the flow is regulated by the temperature of the regenerated catalyst which is the temperature to be controlled. The specific combination of the valve system with the cooler permits maintaining in the cooler a head of dense phase catalyst which can be adjusted to optimum heights or levels resulting in flexibility of operation.

It will be understood by those skilled in the art that the foregoing has been written to disclose the invention and is not in any way intended to be complete with respect to details of materials of construction or apparatus such as, pumps, safety devices, and other details which a person skilled in the art in possession of this disclosure will routinely supply.

*Specific example*

A virgin gas oil produced by distillation of Western Kansas crude oil, said gas oil having a gravity API 60/60° F. of 33.0, is catalytically cracked under fluidizing conditions with a synthetic silica-alumina cracking catalyst, said catalyst having a mesh size, Tyler mesh, of 100 to 400, in a reaction zone at a temperature of 925° F. and at a pressure of 12 p.s.i.g. The catalyst to oil weight ratio is 6 to 1, and used catalyst is removed at the rate of 1200 tons per hour containing 1.35 weight percent carbon (coke) thereon. This spent catalyst is stripped of occluded hydrocarbons and is passed via line 11, using regeneration air and steam as the transporting fluid, into the base of regenerator 10. Coke is burned off in the regeneration zone to 0.35 weight percent. This exothermic regeneration of the catalyst causes an increase in the catalyst temperature. It is desired, in this operation, to maintain the regenerated catalyst temperature at 1100±5° F. Thusly, the regenerated catalyst at 1100±5° F. is withdrawn from the regenerator via line 14 and is passed to a stripping zone (not shown) to remove occluded gases from the solid, steam being used as the stripping fluid. The hot regenerated, stripped, catalyst with 0.35 weight percent coke is passed to the riser to the reactor (not shown) wherein it is conveyed to the reactor zone by means of the gas oil charge, along with steam.

In order to maintain the regenerated catalyst at a temperature of 1095 to 1105° F., in this operation, a stream of catalyst from the regenerator is passed in a dense phase condition via leg 15 and control valve 16 downwardly through cooler or exchanger 17 and cooled solids are passed via control valve 18 and leg 19 into the recycle riser 20 wherein the cooled catalyst, in dilute phase, is returned to the regenerator using carrier air introduced upstream of the cooled catalyst entry into riser 20 as the transporting fluid.

This downward flow of catalyst through the exchanger tubes of heat exchanger 20 results in substantially no erosion of the tubes. Further, there is substantially no erosion of the control valves.

When the temperature in the regenerator, that is the catalyst therein, rises above 1105° F., valve 18, on regeneration temperature control, opens to a greater degree to allow additional cool solids to be returned to the regenerator, which is desired. As the flow through valve 18 increases, the differential pressure across valve 18 decreases. This lower differential pressure actuates a further opening of valve 16 to allow additional hot solids to flow to cooler 17. In this manner, a greater amount of cooled solids is returned to the regenerator to maintain the catalyst temperature below the preset maximum of 1105° F.

On the other hand, when the regenerator catalyst temperature falls to below the preset minimum of 1095° F., in this operation, valve 18, on regenerator temperature control, closes to a greater degree to decrease the flow of cooled solids to the regenerator, which is now desired. As this flow through valve 18 decreases, the differential pressure across valve 18 increases. This increase in differential pressure actuates a further closing of valve 16 to decrease the quantity of hot catalyst flow to cooler 17 from the regenerator. In this manner, a lesser amount of cooled solids is returned to the regenerator to maintain the catalyst temperature above the preset minimum of 1095° F.

The heat load on the exchanger 17 is about 100,000,000 B.t.u./hour when the catalyst is circulated in the regenerator-reactor system at 1200 tons per hour, and in burning off 1.0 weight percent coke (that is, decreasing the coke weight percent from 1.35 to 0.35). The catalyst circulation through the cooler 17 is about 7.5 tons per minute at 700° F. exit temperature, and about 80,000#/hour water is circulated through exchanger 17. This amount and temperature, of course, varies to maintain the regenerated catalyst temperature at 1095 to 1100° F. Such variations in amounts and temperature of cooled catalyst are effected by this control system as above-described.

Reasonable variation and modification are possible within the scope of the foregoing disclosure, drawing, and appended claims to the invention, the essence of which is that there have been provided a method and apparatus suitable for the regeneration of a catalyst such as a fluidized conversion catalyst or other erosive fluid comprising a fluidized solids temperature conditioning apparatus comprising, in combination, a conditioning vessel, means in operative relationship with said vessel to contact the same with a temperature conditioning fluid so as to cause indirect heat exchange relationship between said fluid, water for example, and the fluidized solids in said vessels, a silica-alumina cracking catalyst for example, a valved conduit in an upper portion of said vessel adapted to supply fluidized solids into the interior of said vessel, a valved conduit in a lower portion of said vessel adapted to discharge conditioned fluidized solids from said vessel, means for detecting pressure drop across the valve in said second conduit and transmitting to the valve in said first valved conduit a control to at least partially close said last mentioned valve whenever said pressure drop tends to exceed a predetermined maximum, said valve in the valved conduit in said lower portion of said vessel being adapted to be controlled responsive to a temperature of said fluidized solids when said solids are not in said conditioning vessel; said method comprising flowing fluidized solids downwardly into and through a heat exchange zone, through a variable flow controlling zone, flowing fluidized solids from said heat exchange zone through another variable flow controlling zone and controlling the flow through said first mentioned variable flow controlling zone responsive to the pressure drop through said second variable flow controlling zone to maintain said drop below a predetermined maximum.

I claim:

1. A method for controlling the regeneration of a fluidized catalyst which comprises admixing said catalyst with a regeneration fluid in proportions sufficient to convey said catalyst in a fluidized state and to cause regeneration of the same, passing the fluidized mixture thus obtained into a regeneration zone, in said zone causing regeneration of said catalyst to occur by maintaining in said zone a bed of fluidized mixture under regeneration conditions for a time sufficient that regeneration takes place, removing at least a portion of said fluidized mixture from said zone into a controlled flow transfer zone located below the level of the bed in said regeneration zone, passing fluidized mixture from said controlled flow transfer zone downwardly into and through a catalyst cooling zone and from said cooling zone through a controlled flow outlet zone into another transfer zone, in said last mentioned transfer zone admixing catalyst with a transporting medium, returning the admixture last obtained to said bed, controlling the amount of catalyst flowing from said cooling zone through said outlet zone by operating a flow through said outlet zone responsive to the temperature of the catalyst in the bed in the regeneration zone and controlling the amount of catalyst in said cooling zone by controlling the flow through said controlled flow transfer zone responsive to the pressure differential across said controlled flow outlet zone to maintain said pressure differential below a predetermined maximum related to the head of catalyst desired to be maintained in said cooling zone.

2. A method for controlling the regeneration temperature of fluidized solids undergoing regeneration which comprises determining the temperature of the fluidized solids in a regeneration zone, passing said fluidized solids downwardly from said regeneration zone through a first variable flow controlling zone, passing said fluidized solids from said first variable flow controlling zone into and through a heat exchange zone, passing said fluidized solids from said heat exchange zone through a second variable flow controlling zone, controlling the flow through said second variable flow controlling zone responsive to said regeneration temperature of said fluidized solids, and controlling the flow through said first variable flow controlling zone responsive to the pressure drop through said second variable flow controlling zone to maintain said drop below a predetermined maximum while at the same time maintaining said regeneration temperature in said regeneration zone at a predetermined desirable value by returning to said regeneration zone the fluidized solids as these emerge from said second variable flow controlling zone.

3. An apparatus suitable for the regeneration of a fluidized catalyst comprising, in combination, a regenerator vessel adapted to contain a bed of fluidized catalyst, to regenerate same and to remove substantially therefrom regeneration gases and gases resulting from regeneration of said catalyst, a first valved transfer pipe, located in a substantially upright position below the level of the bed of catalyst in said vessel when it is acting to regenerate catalyst, a catalyst cooler in communication with said transfer pipe, a second valved transfer pipe below said cooler communicating with said cooler, a third transfer pipe communicating with said second valved transfer pipe and with said vessel adapted to receive catalyst from said cooler and to convey the same together with conveying fluid through said vessel, temperature sensing means in said vessel, adapted to sense a temperature of catalyst undergoing regeneration therein, connected operatively to the valve in said second valved transfer pipe to control the flow of catalyst therethrough responsive to said temperature of catalyst to increase flow when the temperature increases and vice versa and means responsive to pressure differential across said valve in said second valved transfer pipe to control the valve in said first valved transfer pipe so as to maintain said pressure differential below a predetermined maximum.

4. A fluidized solids temperature conditioning apparatus comprising, in combination, a conditioning vessel, means in operative relationship with said vessel to contact the same with a temperature conditioning fluid so as to cause indirect heat exchange relationship between said fluid and fluidized solids in said vessel, a valved conduit in an upper portion of said vessel adapted to supply fluidized solids into the interior of said vessel, a valved conduit in a lower portion of said vessel adapted to discharge conditioned fluidized solids from said vessel, means for detecting pressure drop across the valve in said second conduit and transmitting to the valve in said first valved conduit a control to at least partially close said last mentioned valve whenever said pressure drop tends to exceed a predetermined maximum.

References Cited in the file of this patent

UNITED STATES PATENTS

| | | |
|---|---|---|
| 2,409,353 | Giuliani et al. | Oct. 15, 1946 |
| 2,422,793 | McAfee | June 24, 1947 |
| 2,487,961 | Angell | Nov. 15, 1949 |
| 2,905,635 | Harper | Sept. 22, 1959 |